Jan. 6, 1925.
E. V. OSWALD
FISHING TOOL
Filed Sept. 22, 1923
1,521,789
2 Sheets-Sheet 1
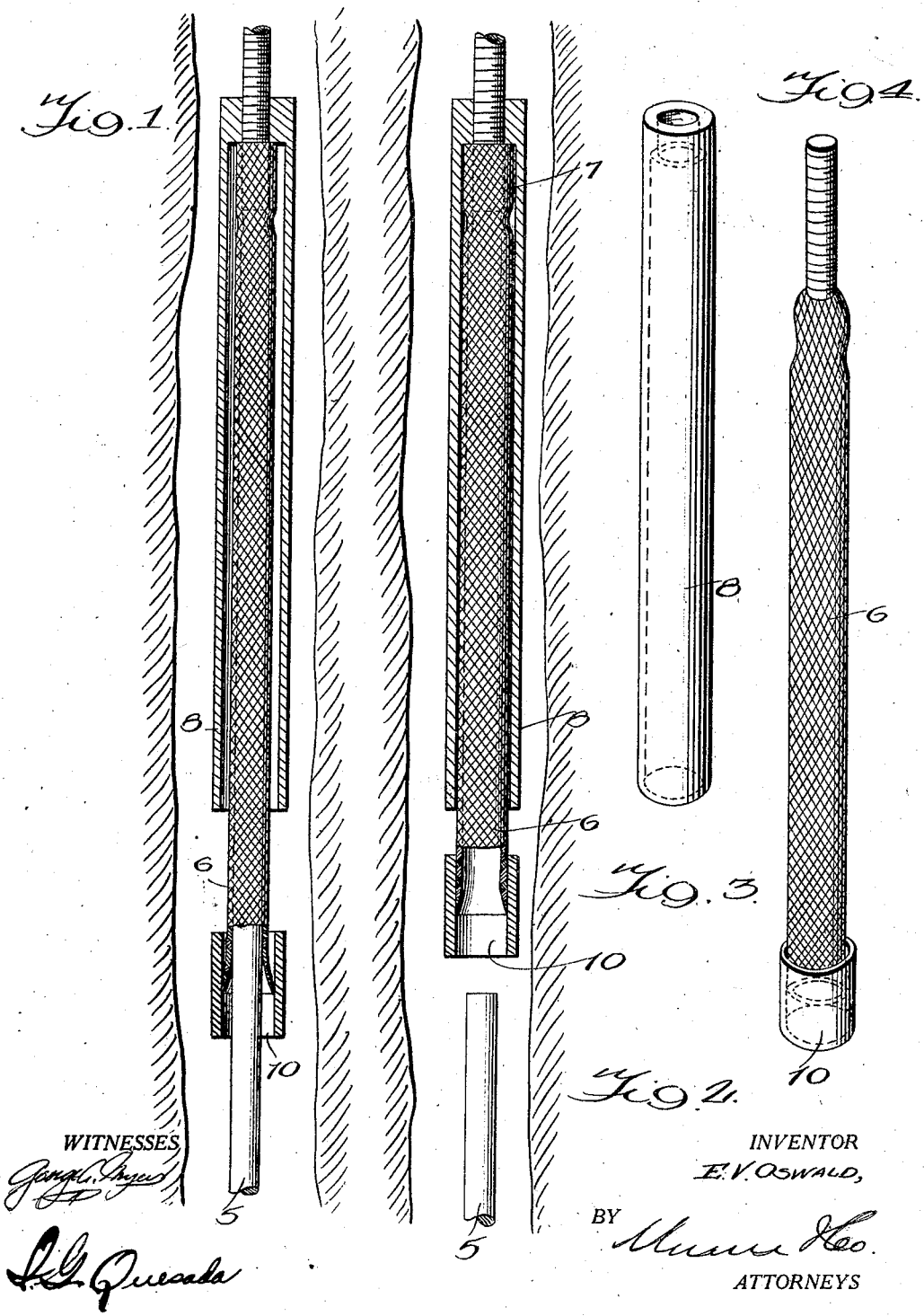
WITNESSES
INVENTOR
E. V. OSWALD,
BY
ATTORNEYS

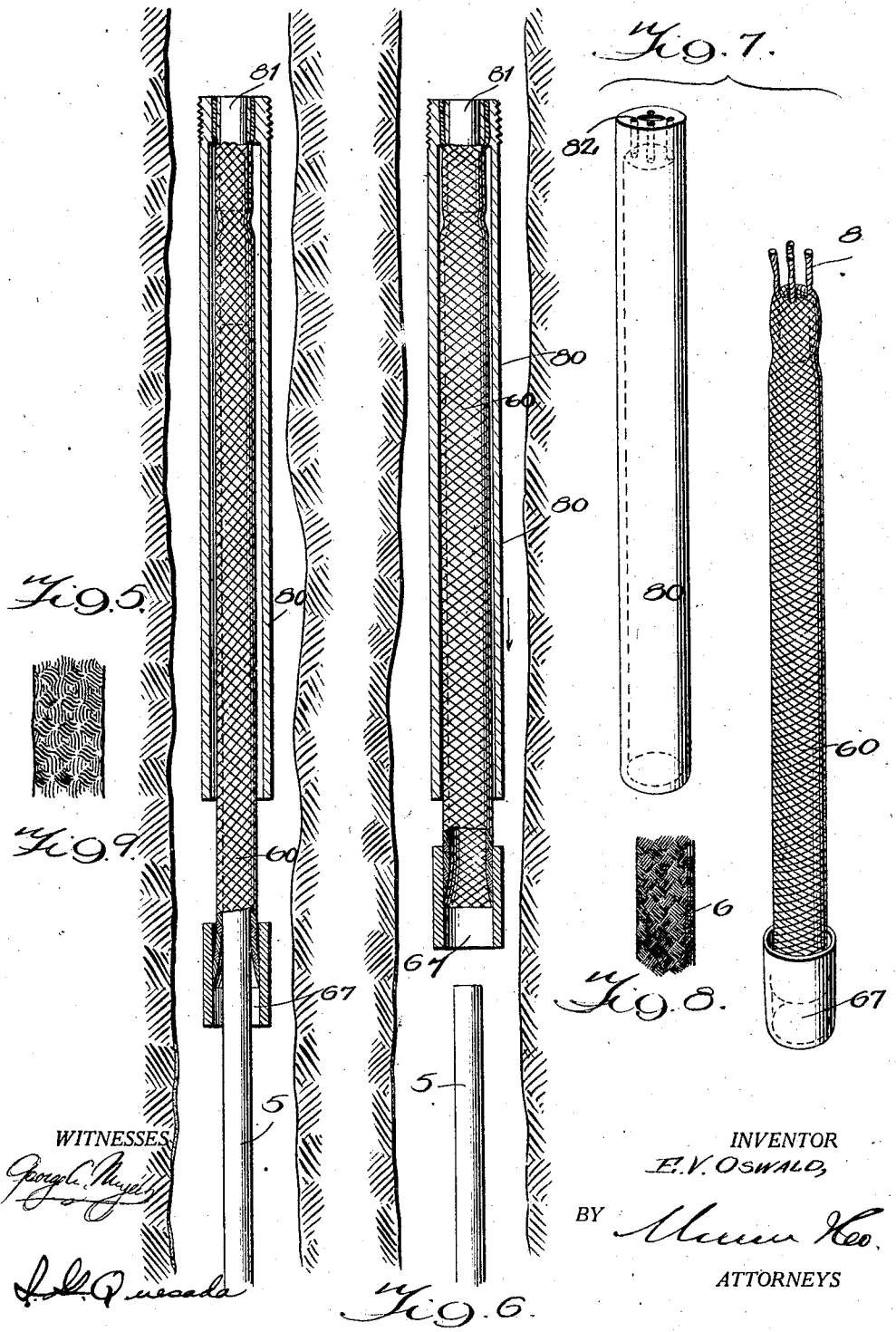

Patented Jan. 6, 1925.

1,521,789

UNITED STATES PATENT OFFICE.

EMIL VINCENT OSWALD, OF LOST HILLS, CALIFORNIA.

FISHING TOOL.

Application filed September 22, 1923. Serial No. 664,265.

*To all whom it may concern:*

Be it known that I, EMIL VINCENT OSWALD, a citizen of the United States, and resident of Lost Hills, in the county of Kern and State of California, have invented certain new and useful Improvements in Fishing Tools, of which the following is a specification.

This invention relates to fishing tools especially adapted for use in wells.

Briefly stated an important object of this invention is to provide a fishing tool having novel means for withdrawing sucker rods or other objects which could not be conveniently gripped by toothed fishing tools.

Specifically the invention forming the subject matter of this application is especially designed for gripping a sucker rod or the like when the space between the sucker rod and the tubing is very limited.

A further object of the invention is to provide a fishing tool which is characterized by the absence of teeth and which is of highly simplified construction and is cheap to manufacture.

Other objects and advantages will be apparent during the course of the following description.

In the accompanying drawing forming a part of this application and in which like numerals are employed to designate like part throughout the same.

Figure 1 is a vertical section illustrating the improved fishing tool engaged with a sucker rod;

Figure 2 is a vertical sectional view through the tool illustrating the same in position to engage the sucker rod or the like;

Figure 3 is a group perspective of a protector sleeve embodied in the invention;

Figure 4 is a perspective illustrating a gripping member embodied in the invention;

Figure 5 is a longitudinal sectional view through a modified form of invention in its operative position;

Figure 6 is a longitudinal sectional view through the tool in position to receive the object to be withdrawn from the well;

Figure 7 is a group perspective illustrating the gripping member and protecting sleeve therefor;

Figure 8 is a detail sectional view illustrating the formation of the flexible gripping member;

Figure 9 is a detail elevation illustrating a slightly modified form of gripping member.

In the drawing the numeral 5 designates a sucker rod or the like, which may be disconnected from the lowering cable or which is broken intermediate the ends thereof so that a fishing job is necessary to remove the same from the well.

In carrying out the invention I provide a flexible expansion tube 6 and I anchor the same as indicated at 7 within a protector tube or member 8. Figures 1 and 2 plainly illustrate that the bore of the protector tube 8 is amply large enough to receive the flexible tube 6 and to permit of the lateral expansion of the same. It will be observed that the flexible tube 6 is anchored at its rear end to the protector tube 8 and has its remaining portion entirely free for longitudinal and lateral expansion and contraction.

The forward end of the flexible tube 6 at all times extends beyond the protector tube 8 and is provided with an attaching collar 10 by means of which a sucker rod or other object to be removed is directed into the tube. The forward portion of the flexible tube 6 is extended into the guide collar 10 and is secured thereto by any suitable means and the collar extends beyond the forward end of the tube so as to form a guide means.

In operation the tool is lowered through the tubing by a suitable cable or the like and the attaching collar 10 and the flexible tube 6 will receive the rod 5 or other well equipment to be removed. The frictional contact incident to the entrance of the sucker rod 5 into the flexible tube 6 will tend to expand the tube 6 laterally and thereby permit the sucker rod to freely enter.

When the sucker rod 5 has entered a considerable portion of the tube 6 the tool is elevated and frictional contact between the rod 5 and the tube 6 will tend to reduce the internal diameter of the flexible tube and cause the tube to securely and positively grip the rod 5. As the elevating power is increased the contact between the flexible tube 6 and the sucker rod will be tightened.

Figure 8 illustrates that the flexible and longitudinally and laterally expansible tube 6 consists of a series of interwoven spirally arranged lengths of material each one of which consists of strands of wire laid side by side. By the particular construction of the tube 6 the same is caused to securely and flatly grip the sucker rod so that on the upward movement of the tool the sucker rod will be removed also.

The foregoing illustrates that a tool constructed in accordance with this invention does not employ barbs or the like and consequently does not damage the sucker rod when engaged therewith.

Upon the removal of the sucker rod from the well it is merely necessary to contract the flexible tube 6 by hand so that the same will be expanded laterally and the sucker rod may then be removed.

In the form of invention illustrated in Figures 5, 6 and 7, the protecting sleeve 80 has its rear portion open and formed with an internal shoulder 81 having longitudinal openings 82 for the reception of the strands 83 at the rear end of the flexible gripping and expansible member 60. As illustrated in Figure 7, the rear portion of the flexible member 60 is divided into four or more strands adapted to be secured in the openings 82 by babbitt or other suitable means and of course the rear end of the tubular member 60 is open.

This permits the object being fished for to pass through the entire tool whereby a firm engagement is had on the object. In this form of the invention the forward portion of the flexible member 60 is provided with a rigid collar 67 by means of which the tool may be readily and conveniently applied to the object, be it a sucker rod or the like.

A tool constructed in accordance with this invention is capable of use in fishing for sucker rods, drill stems or other mechanism employed in drilling and operating wells, and by reason of the contracting feature of the tube 60 the object is secured and positively engaged and the gripping engagement between the tube and the object is increased as the strain on the object 5 is increased.

The gripping tube may be modified as illustrated in Figure 9, wherein it is illustrated that each strand of the interwoven tube may consist of a series of wires, and the wires are so twisted together that each strand is round in cross section or approximately so.

This form of flexible tube may be employed where great strength and elasticity are desired.

In carrying out the invention the rear portion of the protector tube 80 is exteriorly screw threaded for engagement with an actuating mechanism of any suitable type.

It will be seen that the attaching collar 10 is of substantially the same diameter as the diameter of the protector tube 8 so that the rearward movement of the collar is limited by the protector tube. Furthermore, it will be seen that this limits the contraction and consequently the lateral expansion of the flexible tube 6.

Having thus described the invention, what I claim is:—

1. A fishing tool comprising a longitudinally and laterally expansible and contractive tube adapted to receive and securely grip a sucker rod, and means whereby to connect the tube to a lowering mechanism, said tube being formed of woven material, the weave of which is on the bias.

2. A fishing tool comprising a longitudinally and laterally expansible and contractive woven tube adapted to receive and securely grip a sucker rod, means whereby to connect the tube to a lowering mechanism, a protector tube receiving said first named tube and terminating short of the forward end of the same.

3. A fishing tool for wells comprising a flexible woven tube capable of expanding and contracting longitudinally and laterally, and means whereby the tube may be connected to a lowering mechanism, the weave of said tube being on the bias.

4. A fishing tool for wells comprising a flexible woven tube capable of expanding and contracting longitudinally and laterally, means whereby the tube may be connected to a lowering mechanism, and a protector tube receiving the first named tube and terminating short of the forward end of the same, said tube consisting of woven wire, the weave of said tube being on the bias.

5. A fishing tool for wells comprising a flexible woven tube capable of expanding and contracting longitudinally and laterally, means whereby the tube may be connected to a lowering mechanism, and a guide collar receiving the forward portion of said first named tube and terminating beyond the same, the weave of said tube being on the bias.

6. A fishing tool for wells comprising a flexible tube capable of expanding and contracting longitudinally and laterally, means whereby the tube may be connected to a lowering mechanism, and a guide collar receiving the forward portion of said first named tube and terminating beyond the same, said flexible tube consisting of a series of woven lengths of material extending spirally about the longitudinal axis of the tube.

7. A fishing tool for wells comprising a flexible tube capable of expanding and contracting longitudinally and laterally, means whereby the tube may be connected to a lowering mechanism, and a guide collar receiving the forward portion of said first named tube and terminating beyond the same, said flexible tube consisting of a series of woven lengths of material extending spirally about the longitudinal axis of the tube, each length of material consisting of a plurality of strands arranged side by side.

8. A tool for wells comprising a flexible tube having means whereby the same may expand and contract longitudinally and laterally, a rigid protector tube receiving the major portion of the flexible tube, and an attaching collar of rigid formation connected to the forward end of the flexible tube and being of approximately the same diameter as the protector tube, said attaching collar being limited in its rearward movement by said protector tube.

9. A fishing tool comprising a flexible tube having means whereby the same may be expanded longitudinally and contracted laterally for engaging the object to be removed, and a protector tube receiving the first named tube and having its rear end open, the rear end of the first named tube also being open and having a plurality of attaching portions connected to the rear end of said protector tube.

10. A fishing tool for wells comprising a flexible tubular body formed of interwoven material whereby the tube may contract and engage an object to be removed, and a protector tube of rigid form receiving the first named tube and having its rear end open and formed with a series of small openings, the rear end of said first named tube being provided with attaching strands adapted to be extended through said small openings and anchored therein.

11. A fishing tool for wells comprising a flexible tubular body formed of interwoven material whereby the tube may contract and engage an object to be removed, a protector tube of rigid form receiving the first named tube and having its rear end open and formed with a series of small openings, the rear end of said first named tube being provided with attaching strands adapted to be extended through said small openings and anchored therein, and an attaching collar secured to the forward end of said first named tube.

12. A fishing tool for wells comprising a flexible tubular body formed of interwoven material whereby the tube may contract and engage an object to be removed, a protector tube of rigid form receiving the first named tube and having its rear end open and formed with a series of small openings, the rear end of said first named tube being provided with attaching strands adapted to be extended through said small openings and anchored therein, an attaching collar secured to the forward end of said first named tube, the exterior of said protector tube being provided with means whereby the same may be attached to an actuating mechanism.

13. A fishing tool comprising a flexible tube of interwoven material having means whereby the same may contract for engaging an object, the rear end of said tube being open for the passage of the object to be removed, the weave of said material being on the bias.

EMIL VINCENT OSWALD.